(12) United States Patent
Auranen (10) Patent No.: US 7,227,917 B2
(45) Date of Patent: Jun. 5, 2007

(54) REDUCING EFFECTS OF SELF-CREATED INTERFERENCE ON BROADBAND RECEPTION

(75) Inventor: Tommi Auranen, Turku (FI)

(73) Assignee: Nokia Corporation, Espoo (FI)

( * ) Notice: Subject to any disclaimer, the term of this patent is extended or adjusted under 35 U.S.C. 154(b) by 654 days.

(21) Appl. No.: 10/479,789

(22) PCT Filed: Jun. 6, 2002

(86) PCT No.: PCT/FI02/00484

§ 371 (c)(1),
(2), (4) Date: Dec. 5, 2003

(87) PCT Pub. No.: WO02/101946

PCT Pub. Date: Dec. 19, 2002

(65) Prior Publication Data

US 2004/0157578 A1 Aug. 12, 2004

(30) Foreign Application Priority Data

Jun. 8, 2001 (FI) .................................. 20011219

(51) Int. Cl.
*H03D 1/04* (2006.01)
*H04B 7/00* (2006.01)

(52) U.S. Cl. .................... 375/346; 455/278.1; 455/296

(58) Field of Classification Search ................ 375/346, 375/348, 324, 340, 144, 148, 233, 261; 329/318, 329/349; 455/84, 278.1, 283, 296; 370/345
See application file for complete search history.

(56) References Cited

U.S. PATENT DOCUMENTS

| | | | | |
|---|---|---|---|---|
| 5,563,632 A | * | 10/1996 | Roberts | ...................... 345/173 |
| 6,014,412 A | | 1/2000 | Wiese et al. | |
| 6,026,116 A | | 2/2000 | Heidemann et al. | |
| 6,205,183 B1 | * | 3/2001 | Dent | ........................... 375/261 |
| 6,259,752 B1 | | 7/2001 | Domino | |
| 2005/0129153 A1 | * | 6/2005 | McCorkle | .................... 375/346 |
| 2005/0254572 A1 | * | 11/2005 | Garg et al. | ................. 375/233 |

FOREIGN PATENT DOCUMENTS

| | | |
|---|---|---|
| WO | WO 00/04657 | 1/2000 |
| WO | WO 02/31988 A2 | 4/2002 |

OTHER PUBLICATIONS

Caini et al., DS-CDMA Code Acquisition in the Presence of Correlated Fading-Part II: Application to Cellular Networks, IEEE Transactions on Communications, vol. 52, pp. 1397-1407.*

* cited by examiner

*Primary Examiner*—Emmanuel Bayard
*Assistant Examiner*—Lawrence Williams
(74) *Attorney, Agent, or Firm*—Alston & Bird LLP (57) ABSTRACT

The invention relates to a method for reducing effects of self-created digital radio frequency interference on broadband reception. In the method a DVB-T (Digital Video Broadcasting—Terrestrial) signal is received at a broadband receiver (200). The received signal is demodulated in a demodulation process. Information (210) on frequencies of self-created digital radio frequency interference is provided for the broadband reception. The information has been generated based on prior measurements and stored to a memory prior to the receiving of the DVB-T signal. The information is used in the broadband reception so as to reduce the effects of the self-created digital radio frequency interference on the broadband reception.

21 Claims, 6 Drawing Sheets

REDUCING EFFECTS OF SELF-CREATED INTERFERENCE ON BROADBAND RECEPTION

FIELD

The invention relates to reducing the effects of digital interference in broadband reception. The invention relates especially, but not exclusively, to reducing these effects in a portable/mobile broadband receiver.

BACKGROUND

Digital broadcasting systems, such as the digital television system, have been under development, and they are seen to gradually replace the analog broadcasting systems. This is, among other things, because of their ability to provide new types of services and better quality of service compared to the analog broadcasting systems.

One of the digital broadcasting systems currently being under standardisation by the European Telecommunications Standards Institute (ETSI) is the Digital Video Broadcasting (DVB) system. In the DVB system digital video is broadcasted using satellite, cable and/or terrestrial infrastructures.

The DVB system using terrestrial infrastructure is defined as DVB-T (DVB-Terrestrial) system. In DVB-T transmission digital data is modulated into a radio frequency (RF) signal. The modulation method used is the COFDM (Coded Orthogonal Frequency Division Multiplex) modulation. The modulated DVB-T signal is transmitted from a DVB-T transmitter. The transmission occurs over a DVB-T radio channel. The transmitted DVB-T signal is received at a so called set top box (STB) containing a DVB-T receiver. The DVB-T receiver demodulates the received DVB-T signal in order to regenerate the digital data. The digital data may contain for example an MPEG-2 (Moving Picture Experts Group) coded video stream.

Figure 1:
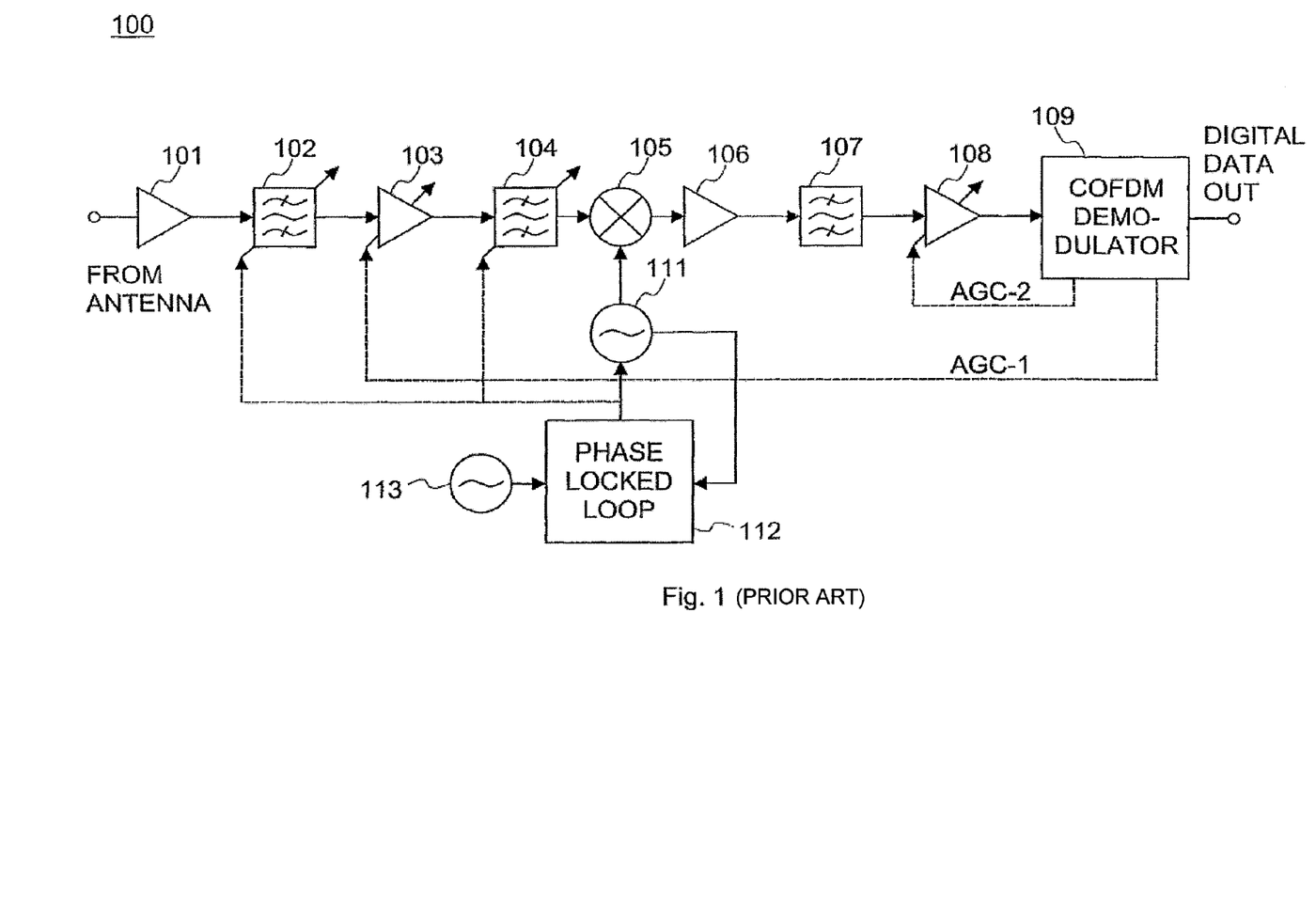
FIG. 1 shows a receiver according to prior art.

FIG. 1 shows funtional blocks of a DVB-T receiver according to prior art. The DVB-T receiver 100 shown in FIG. 1 functions according to a well known superheterodyne principle.

A COFDM modulated radio frequency DVB-T signal sent from a transmitter and received via an antenna is conveyed to a low noise amplifier 101 of the DVB-T receiver 100. In the low noise amplifier 101 the DVB-T signal is amplified in order to raise the power level of the received DVB-T signal. The amplified DVB-T signal is conveyed to a tracking filter 102. The tracking filter 102, which is an adjustable band pass filter, filters the DVB-T signal to attenuate the frequency components that lie outside the frequency band which is desired to be received. From the tracking filter 102 the DVB-T signal is conveyed to an adjustable RF amplifier 103 which amplifies the filtered DVB-T signal in order to compensate losses caused in the tracking filter 102. From the adjustable RF amplifier 103 the DVB-T signal is conveyed to a second adjustable tracking filter 104 for band pass filtering. The purpose of the second adjustable tracking filter 104 is to attenuate the image frequencies of the DVB-T signal. The filtered DVB-T signal is conveyed from the second tracking filter 104 to a first input of a down conversion mixer 105.

A local oscillator 111 generates a local oscillator signal. A phase locked loop 112 controls the frequency of the local oscillator signal as well as the pass band of the previously mentioned adjustable tracking filters 102 and 104. The frequency of the local oscillator signal is controlled with the aid of a feedback from the local oscillator 111 to the phase locked loop 112 and with the aid of a reference oscillator signal which a reference oscillator 113 provides for the phase locked loop 112. The local oscillator signal is conveyed to a second input of the down conversion mixer 105.

The down conversion mixer 105 mixes the DVB-T signal coming from the second tracking filter 104 with the local oscillator signal in order to convert the DVB-T signal down into the frequency band of an intermediate frequency (IF). The down converted DVB-T signal is conveyed to an IF amplifier 106 which amplifies the down converted DVB-T signal. From the IF amplifier 106 the DVB signal is conveyed to an IF filter 107 which band pass filters the amplified DVB-T signal. The IF filter 107 is a band pass filter of a fixed pass band the width of which is substantially the same as the width of one DVB-T channel. The pass band of the IF filter 107 has steep edges so as to strongly attenuate the frequency components that lie outside the width of the DVB-T channel. From the IF filter 107 the DVB-T signal is conveyed to an adjustable IF amplifier 108 which amplifies the signal before the signal is conveyed to a COFDM demodulator 109. The COFDM demodulator 109 is a digital demodulator block which demodulates the received COFDM modulated DVB-T signal so as to form the (original) digital data. From the COFDM demodulator 109 the digital data may be conveyed, for example, to an MPEG-2 decoder or to another appropriate functional block.

The COFDM demodulator 109 itself may comprise a plurality of functional blocks (not shown) the operation of which is generally known to a person skilled in the art. Typically, the COFDM demodulator 109 contains blocks for performing analog-to-digital conversion (ADC), automatic gain control (AGC), Fast Fourier Transform (FFT), channel estimation and correction, and channel decoding.

Of the mentioned blocks the ADC is used to convert the received DVB-T signal from an analog form to a digital form. The AGC block controls with a feedback control signal AGC-1 the gain of the adjustable RF amplifier 103 and with a feedback control signal AGC-2 the gain of the adjustable IF amplifier 108 so as to optimise the received DVB-T signal voltage level so that the received DVB-T signal fits to an ADC conversion window. The gain is adjusted so that the ADC does not clip, that is the signal voltage of the DVB-T signal does not exceed an upper limit (nor go below a lower limit) of the ADC conversion window, because information carried by a clipped portion of the DVB-T signal will be corrupted or completely lost.

The FFT block is used to transform the analog-to-digital converted signal from time domain to frequency domain. The channel estimation and correction block is used to determine a transfer function H(f) of the DVB-T channel and, based on the transfer function H(f), to correct the effects that the transmission path causes to the DVB-T signal. The channel correction is typically performed by multiplicating the DVB-T signal with a function 1/H(f) which is an inverse function to the determined transfer function H(f). The transfer function H(f) is determined based on particular pilot signals. The pilot signals are signals which are transmitted together with the DVB-T signal but whose transmission amplitudes and location in the spectrum are known, in advance, to the DVB receiver.

The channel decoding block is used to reverse coding and interleaving operations performed at the DVB-T transmitter. For example, error correction (relating to errors occurred in the transmission path) is performed in the channel decoding block.

With terrestrial digital video broadcasting it is possible to achieve a good quality data transfer even if the DVB-T receiver is mobile. However, problems may occur with the mobile DVB-T receiver due to the small size requirement of the mobile communication devices and due to the desire to use internal integrated antennas and rapid digital electronics such as microprosessors/controllers in these devices. Namely, the digital electronics produce radio frequency interference which tend to couple to the device's own antenna(s) thus degrading the performance of the device in the form of bigger overall bit error rates and in the form of reduced receiver sensitivity in at least some of the receiving channels.

One commonly used solution for reducing the effects of this kind of self-created digital interference has been to shield the components causing radio frequency digital interference for example with metal cups.

Another possibility for reducing the effects of self-created digital interference is to make the device bigger in order to have a better separation between the receiving antenna and the sources of the digital interference.

Another possibility is to use external antennas instead of internal antennas. However, it is in many cases desirable to use internal antennas.

The self-created digital interference is considered to be rather stable in frequency domain. The digital interference typically consists mainly of clock oscillator signals, the harmonic signals of the clock oscillator frequency and/or the intermodulation products of the clock signals. The spectrum of the digital interference is considered to be a stable comb-like line spectrum rather than a continuous spectrum. In narrowband systems it may thus be possible to avoid the effects of the digital interference already in the designing phase of the device by designing the device so that no digital interference signals are present in the used (frequency) band. However, in broadband systems (such as the DVB-T system in which the total used bandwidth is around 400 MHz, more specifically 474 MHz–858 MHz) this kind of designing procedure is not very useful due to the broadness of the used bandwidth.

BRIEF SUMMARY

According to a first aspect of the invention there is provided a method for reducing effects of self-created radio frequency interference on broadband reception, the method comprising: receiving a broadband signal at a broadband receiver;

demodulating the received broadband signal in a demodulation process, the demodulation process being a part of the broadband reception;

providing for the broadband reception information on frequencies of self-created radio frequency interference the information having been generated and stored in a memory prior to the receiving of the broadband signal, the memory being accessible to the broadband receiver; and using the information in the broadband reception so as to reduce the effects of the self-created radio frequency interference on the broadband reception.

According to a second aspect of the invention there is provided a broadband receiver for reducing effects of self-created radio frequency interference on broadband reception, the broadband receiver comprising:

an antenna for receiving a broadband signal at the broadband receiver;

a demodulator for demodulating the received broadband signal in a demodulation process, the demodulation process being a part of the broadband reception;

a memory in the broadband receiver or in connection to the broadband receiver for storing information on frequencies of self-created radio frequency interference for the broadband reception the information having been generated prior to the receiving of the broadband signal, the broadband receiver being configured to:

use the information in the broadband reception so as to reduce the effects of the self-created radio frequency interference on the broadband reception.

According to a third aspect of the invention there is provided a communication device communication device comprising a broadband receiver for reducing effects of self-created radio frequency interference on broadband reception, the broadband receiver comprising:

an antenna for receiving a broadband signal at the broadband receiver;

a demodulator for demodulating the received broadband signal in a demodulation process, the demodulation process being a part of the broadband reception;

a memory in the broadband receiver or in connection to the broadband receiver for storing information on frequencies of self-created radio frequency interference for the broadband reception the information having been generated prior to the receiving of the broadband signal, the broadband receiver being configured to:

use the information in the broadband reception so as to reduce the effects of the self-created radio frequency interference on the broadband reception.

Preferably, the communication device is a wireless communication device.

BRIEF DESCRIPTION OF THE DRAWINGS

Embodiments of the invention will now be described by way of example with reference to the accompanying drawings in which.

DETAILED DESCRIPTION

Figure 2:
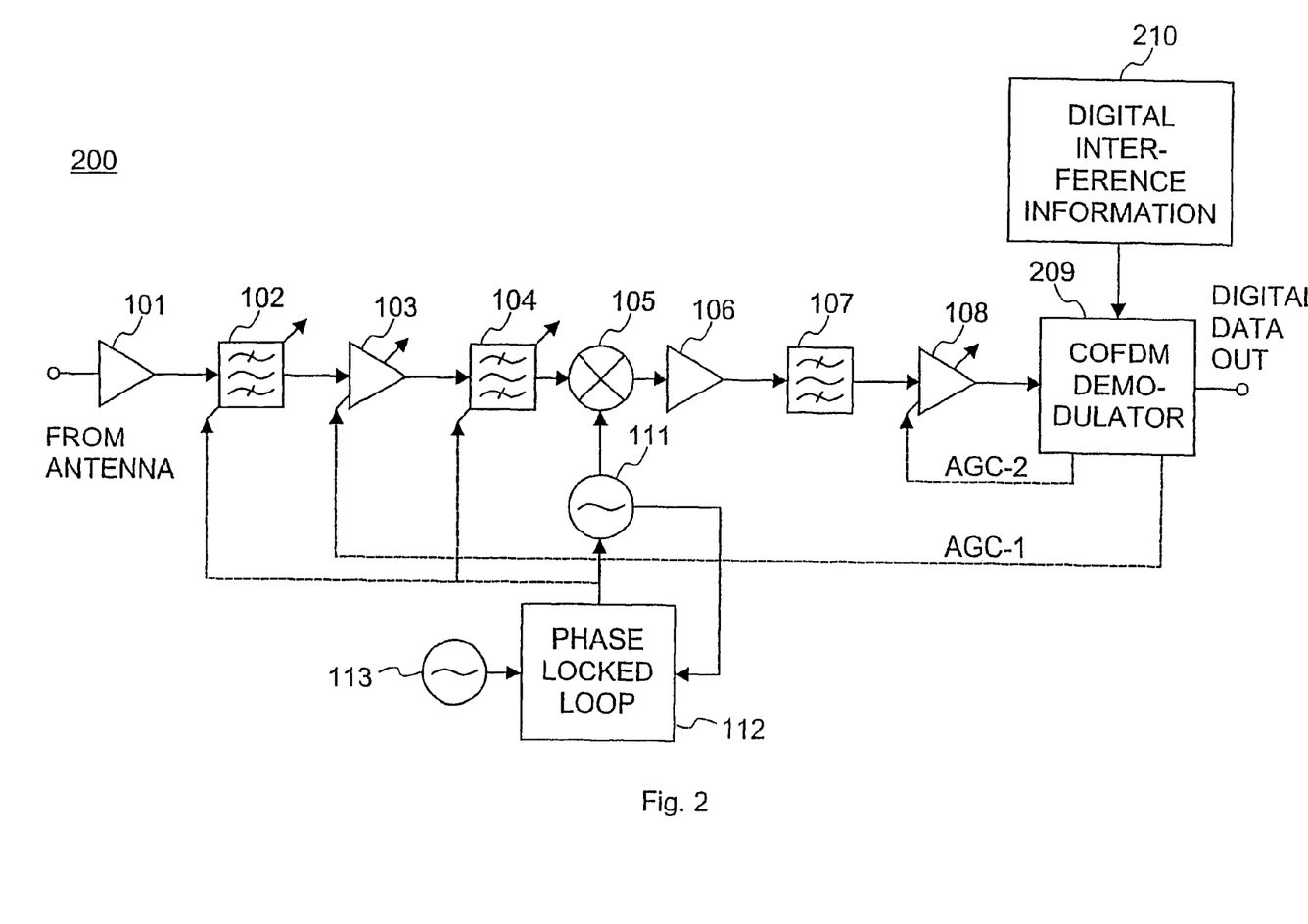
FIG. 2 shows a receiver according to an embodiment of the invention.

FIG. 2 shows a DVB-T receiver 200 according to a preferred embodiment of the invention. The DVB-T receiver 200 is located in a mobile communication device so as to form a portable hand-held device suitable for DVB-T operation. In addition to the DVB-T receiving capability the mobile communication device may have a cellular network capability in order to perform interactive communication with a cellular network such as a cellular telephone network. The device may be called a media terminal or a media screen.

The DVB-T receiver 200 functions generally according to a well known superheterodyne principle. In the preferred embodiment of the invention, digital data which has been COFDM modulated into an analog radio frequency DVB-T signal and which has been sent from a DVB-T transmitter and received via an integral antenna (not shown) of the DVB-T receiver 200 is conveyed to a low noise amplifier 101 of the DVB-T receiver 200. In the low noise amplifier 101 the DVB-T signal is amplified in order to raise the power level of the received DVB-T signal. The amplified DVB-T signal is conveyed to a tracking filter 102. The tracking filter 102, which is an adjustable band pass filter, filters the DVB-T signal to attenuate the frequency components that lie outside the frequency band which is desired to be received. From the tracking filter 102 the DVB-T signal is conveyed to an adjustable RF amplifier 103 which amplifies the filtered DVB-T signal in order to compensate losses caused in the tracking filter 102. From the adjustable RF amplifier 103 the DVB-T signal is conveyed to a second adjustable tracking filter 104 for band pass filtering. The purpose of the second adjustable tracking filter 104 is to attenuate the image frequencies of the DVB-T signal. The filtered DVB-T signal is conveyed from the second tracking filter 104 to a first input of a down conversion mixer 105.

A local oscillator 111 generates a local oscillator signal. A phase locked loop 112 controls the frequency of the local oscillator signal as well as the pass band of the previously mentioned adjustable tracking filters 102 and 104. The frequency of the local oscillator signal is controlled with the aid of a feedback from the local oscillator 111 to the phase locked loop 112 and with the aid of a reference oscillator signal which a reference oscillator 113 provides for the phase locked loop 112. The local oscillator signal is conveyed to a second input of the down conversion mixer 105.

The down conversion mixer 105 mixes the DVB-T signal coming from the second tracking filter 104 with the local oscillator signal in order to convert the DVB-T signal down into the frequency band of an intermediate frequency (IF). The down converted DVB-T signal is conveyed to an IF amplifier 106 which amplifies the down converted DVB-T signal. From the IF amplifier 106 the DVB-T signal is conveyed to an IF filter 107 which band pass filters the amplified DVB-T signal. The IF filter 107 is a band pass filter of a fixed pass band the width of which is substantially the same as the width of one DVB-T channel. The pass band of the IF filter 107 has steep edges so as to strongly attenuate the frequency components that lie outside the width of the DVB-T channel. From the IF filter 107 the DVB-T signal is conveyed to an adjustable IF amplifier 108 which amplifies the signal before the signal is conveyed to a COFDM demodulator 209. The COFDM demodulator 209 is a digital demodulator block which demodulates the received COFDM modulated DVB-T signal so as to form the (original) digital data. From the COFDM demodulator 209 the digital data is conveyed, for example, to an MPEG-2 decoder or to another appropriate functional block.

Figure 3:
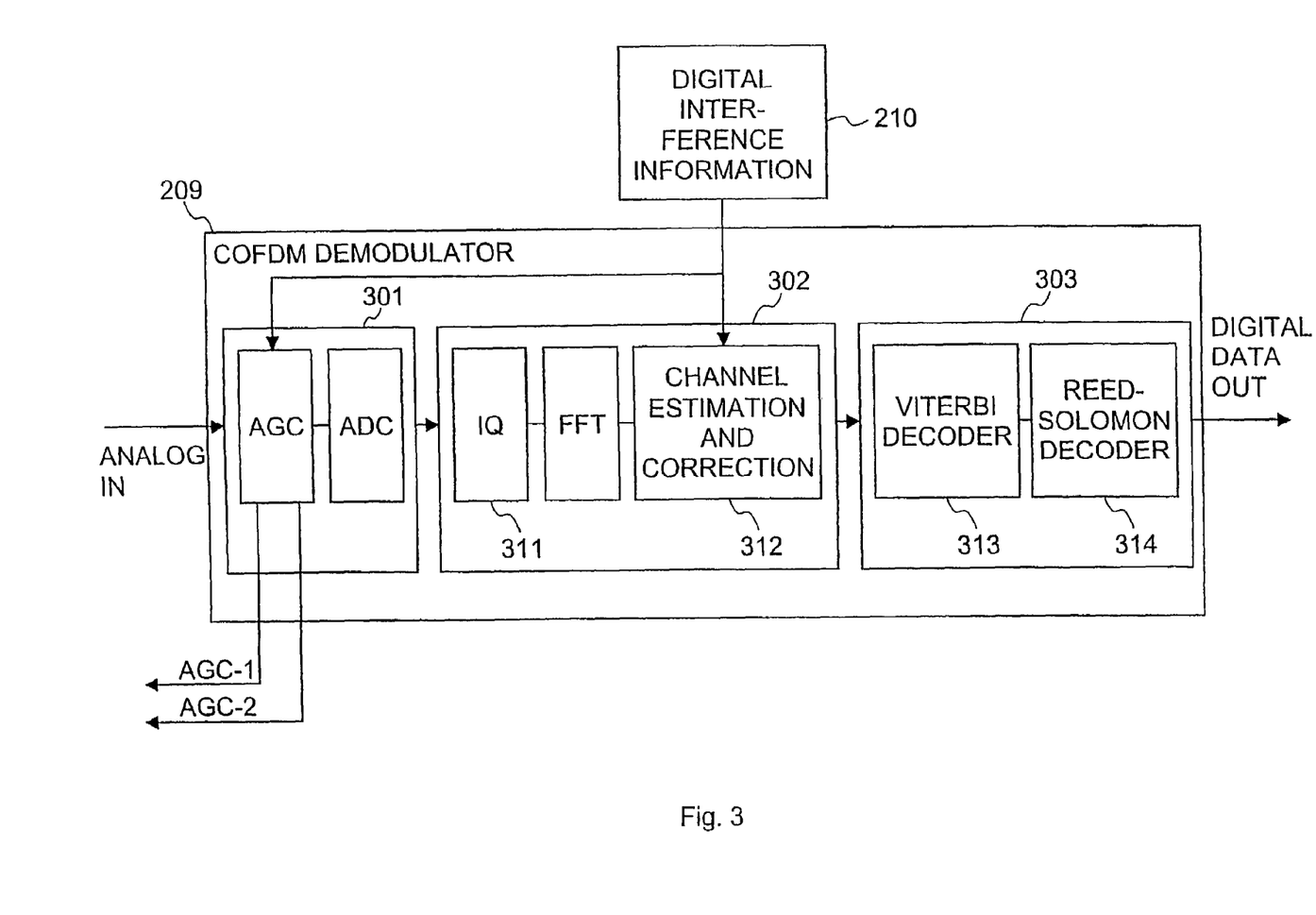
FIG. 3 shows a COFDM (Coded Orthogonal Frequency Division Multiplex) demodulator according to an embodiment of the invention.

FIG. 3 shows the basic blocks of the COFDM demodulator 209. Those are an analog signal processing block 301, an OFDM (Orthogonal Frequency Division Multiplex) demodulator block 302 and a FEC (Forward Error Correction) channel decoder 303. The input signal to the COFDM demodulator 209 arriving from the adjustable IF amplifier 108 is the analog intermediate frequency DVB-T signal. An analog-to-digital converter (ADC) of the analog signal processing block 301 converts the analog intermediate frequency DVB-T signal into a digital intermediate frequency DVB-T signal. An automatic gain control (AGC) block controls with a feedback control signal AGC-1 (see also FIG. 2) the gain of the adjustable RF amplifier 103 and with a feedback control signal AGC-2 (see also FIG. 2) the gain of the adjustable IF amplifier 108 so as to optimise the received DVB-T signal voltage level.

The digital intermediate frequency DVB-T signal is conveyed to the OFDM demodulator block 302. An I/Q-conversion (In phase/Quadrature) block 311 of the OFDM demodulator block converts the digital intermediate frequency DVB-T signal into a complex valued baseband signal. A resampling block (not shown) generates samples based on the baseband signal, and these samples are fed into an FFT block which performs a Fast Fourier Transform to the samples in order to generate a frequency domain DVB-T signal.

A channel estimation and correction block 312 of the OFDM demodulator block 302 is used to determine a transfer function H(f) of the DVB-T receiving channel in use and, based on the transfer function H(f), to correct the effects that the transmission path causes to the DVB-T signal.

The OFDM demodulator block 302 finally generates, based on the corrected DVB-T signal, soft decisions about the transmitted bits, that is it generates probabilities about the transmitted bits.

The soft decisions are conveyed to the FEC channel decoder 303 which performs a two-phase error correction. In the first phase a Viterbi decoder 313 of the FEC channel decoder 303 derives based on the soft decisions, using redundancy inserted by a convolutional encoder of the DVB-T transmitter, the convolutional encoder input bit stream which most probably has been transmitted from the DVB-T transmitter. The derived bit stream is conveyed to a Reed-Solomon decoder 314 of the FEC channel decoder 303. The Reed-Solomon decoder 314 performs the second phase of the error correction, that is the frame decoding. The frame decoded bit stream is conveyed to a descrambling block (not shown) which performs descrambling operations in order to form the originally transmitted digital data.

It is apparent to a person skilled in the art that the blocks 301-303 may comprise sub-blocks other than shown in the FIG. 3 those sub-blocks being apparent for a person skilled in the art. Block 303, for example, may contain additional blocks for performing deinterleaving operations.

The functional blocks 101 to 108 and 111 to 113 of the DVB-T receiver 200 may be implemented in one or more integrated circuits or as separate circuit components. The COFDM demodulator 209 may be implemented, for example, in an integrated circuit having a digital signal processor (DSP) for DVB-T signal processing.

The operation of the COFDM demodulator 209 differs from the operation of the prior art COFDM demodulator 109. In the preferred embodiment of the invention, digital interference information 210 is provided for the COFDM demodulator 209 and the COFDM demodulator 209 uses the information 210 in the demodulation process.

The digital interference information 210 contains information on the self-created digital interference of the mobile communication device. The term "self-created digital interference" refers to radio frequency digital interference which is generated in the DVB-T receiver 200 itself or in other parts of the mobile communication device (of which the DVB-T receiver 200 forms a part) and which couples to the antenna of the DVB-T receiver 200. The digital interference information 210 is generated in advance by measuring the spectrum of the self-created radio frequency digital interference via the mobile communication device's own antenna, that is the antenna of the DVB-T receiver 200. The generated digital interference information 210 is then stored in the device. A suitable point for measurement is after the low noise amplifier 101 but before the tracking filter 102 (FIG. 2). If the low noise amplifier 101 and the tracking filter 102 reside in different integrated circuits the measurement point is easy to find. However, if the low noise amplifier 101 and the tracking filter 102 reside in one and the same integrated circuit the measurement may be performed by coupling an additional low noise amplifier temporarily to the antenna of the DVB-T receiver 200 for the measurement only and by performing the measurement at a suitable point after the additional low noise amplifier.

The measurement of the self-created digital interference may be performed with a spectrum analyser with the power of the mobile communication device being ON. When the measurement is performed in an EMC (ElectroMagnetic Compliance) shielded room the spectral contents of the self-created interference coupled to the mobile communication device's own antenna can be seen with the spectrum analyser.

The measurement may be performed during the design phase of the mobile communication device when the mechanical parts of the mobile communication device, including the interfering components, have been positioned in their final positions. Because the strongest spectral components of the digital interference are considered to be stable in the frequency domain the measurement performed in the design phase is typically enough. A separate measurement of each manufactured mobile communication device of the same model is therefore not needed because the self-created digital interference is considered to be similar in all devices of the same model. In other words, it should be enough to generate the digital interference information 210 based on measuring the self-created digital interference of only one device or of only a few devices of the same model, and then store the digital interference information 210 in all devices of the same model (without a need to perform measurements with those other devices at all).

In this embodiment, the storing of the digital interference information 210 is performed so that a table containing the frequencies of the self-created digital interference is stored in a memory of the mobile communication device. Depending on the implementation the memory may be incorporated in the DVB-T receiver 200 or it may be external to the DVB-T receiver 200. In this embodiment, also the amplitudes of the digital interference are stored to the table. However, it is not in all cases necessary to store the amplitudes.

In most cases, the strongest and most problematic digital interference signals are frequencywise stable. There should thus be no need to store any frequencywise unstable digital interference information to the table. Examples of the strongest interfering signals are clock signals for the processor(s) of the mobile communication device, bus clocks and the various harmonic and intermodulation products of these signals.

The table is split into a plurality of tables each of which contains the digital interference information 210 on the self-created digital interference signals which lie within the bandwidth of each receiving channel. Each DVB-T (receiving) channel thus has its own digital interference table containing the digital interference information 210 (the frequencies and possibly the amplitudes of the interfering signals) of that DVB-T channel. When the DVB-T signal is received at the DVB-T receiver 200 the digital interference information 210 of the correct table is fed to the COFDM demodulator 209. The correct table is selected according to the received DVB-T channel.

As mentioned already in the foregoing the COFDM demodulator 209 uses the digital interference information 210 in the demodulation process of the DVB-T signal. There are various compensation/cancellation methods that may be used. In the following three examplary embodiments of those methods are presented.

Figure 4:
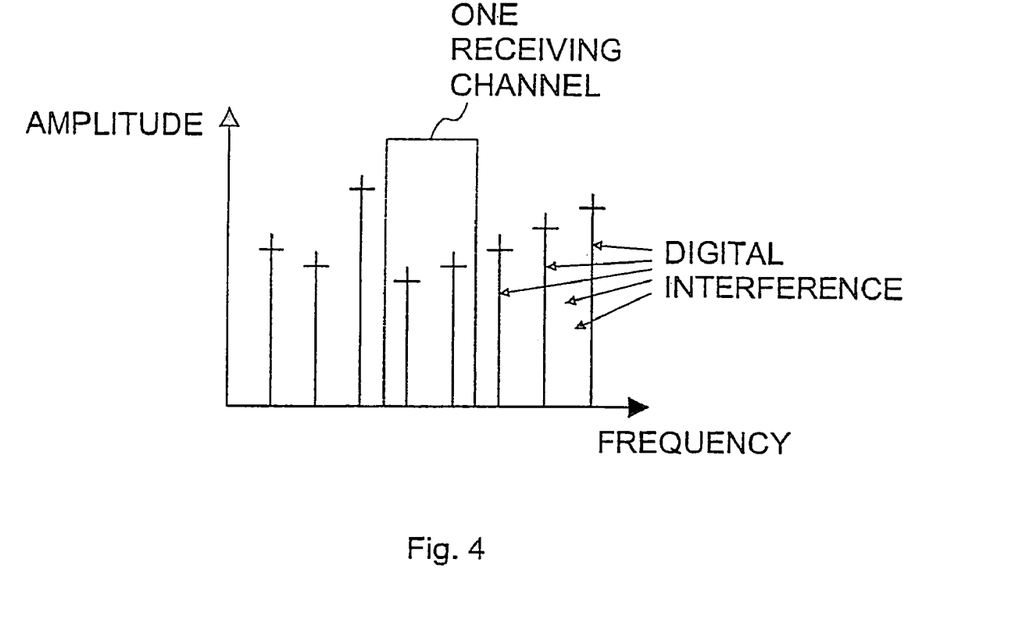
FIG. 4 shows an exemplary spectrum of digital interference.

However, before presenting the first one, the nature of the self created digital interference is refreshed and the modulation method used in the DVB-T system as well as the radio channels of the DVB-T system are more closely introduced. As mentioned in the foregoing the strongest self-created digital interference signals are considered to be stable in frequency domain. FIG. 4 shows an exemplary spectrum of the digital interference. It is a line spectrum containing spectral lines that indicate the amplitudes and the locations of the frequencywise stable self-created digital interference. FIG. 4 also shows one of the plurality of the receiving channels of the DVB-T system. In this exemplary case two of the digital interference signals lie within the receiving channel.

Figure 5:
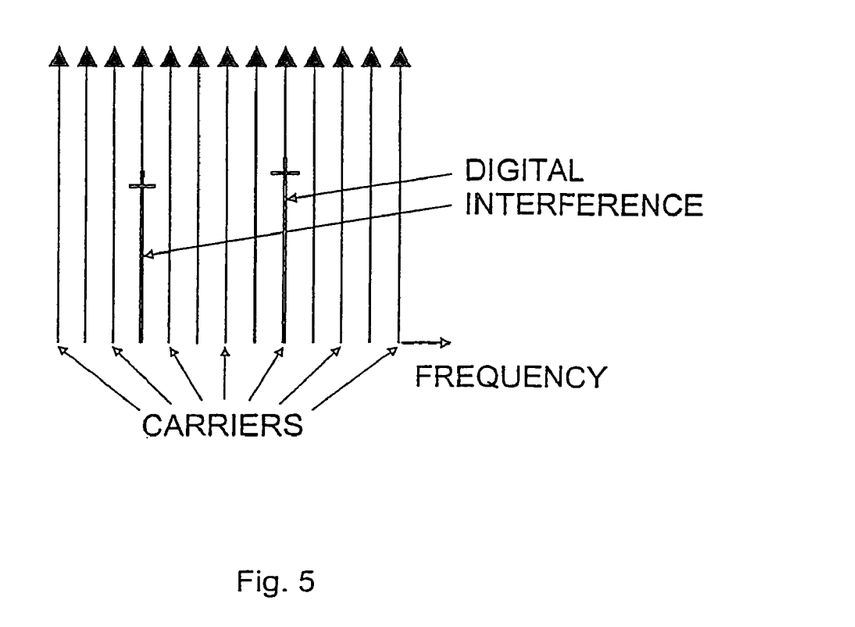
FIG. 5 illustrates carriers and self-created digital interference signals within a DVB-T (Digital Video Broadcasting-Terrestrial) receiving channel.

The modulation method COFDM that is used in the DVB-T system is a multicarrier modulation method. This means that in the DVB-T transmitter digital data to be transmitted is split into several components which are sent over separate carrier signals. In one of the operational modes of the DVB-T system, for example, a DVB-T channel (the bandwidth of which is 8 Mhz) contains 6816 (sub)carriers. FIG. 5 illustrates the carriers and the self-created digital interference signals within a DVB-T receiving channel similar to that shown in FIG. 4. FIG. 5 shows that in this exemplary case two of the digital interference signals are located frequencywise in the same place as two respective carrier signals. This means in practise that these carriers are interfered or totally destroyed so that the information carried by these carriers gets corrupted or completely lost.

According to the first exemplary embodiment the interfered carriers (FIG. 5) are cancelled in the demodulation process in order to improve the quality of the demulation process. In other words the information carried by the interfered carriers is ignored. In more detail this is performed so that when the user of the mobile communication device switches the DVB-T reception ON so that the DVB-T receiver 200 begins to receive the DVB-T signal the contents of the table containing the digital interference information 210 of the received DVB-T channel is fed to the COFDM demodulator 209. The COFDM demodulator 209 performs, based on the digital interference information 210 (the amplitudes of the digital interference are not needed in this embodiment), a digital algorithm in order to cancel the interfered carrier frequencies. More closely, in this embodiment, it is the channel estimation and correction block 312 to which the digital interference information 210 is fed, and it is the channel estimation and correction block 312 which performs the digital algorithm on the FFT transformed DVB-T signal. The digital algorithm may be called a carrier cancellation algorithm (or a frequency cancellation algorithm).

The cancellation of the interfered carriers in the demodulation process most likely leads to a reduction in the bit error rate. More noise can then be tolerated in the received DVB-T channel. This means that weaker DVB-T signals can be received, that is the sensitivity of the DVB-T reception can be improved.

It is to be noted that although the interfered carriers are cancelled in the demodulation process and thus the demodulation process is performed without the information carried by the interfered carriers the transferred digital data can typically be fully regenerated in the DVB-T receiver because of the used error correction scheme which compensates the loss of information occurred due to the carrier cancellation process, using the redundancy inserted to the transmitted DVB-T signal at the DVB-T transmitter side.

It is to be noted that although, according to this embodiment, the channel estimation and correction block 312 performs the carrier cancellation algorithm it also continues to perform its conventional operation. As described in the foregoing, the conventional operation of the channel estimation and correction block 312 involves correcting the effects that the transmission path causes to the DVB-T signal. The channel estimation and correction block 312 uses particular pilot signals in order to determine a transfer function H(f) of the transmission path concerning the used DVB-T channel and, based on the transfer function H(f), corrects the effects that the transmission path, causes to the DVB-T signal. The channel correction is typically performed by multiplicating the DVB-T signal with a function 1/H(f) which is an inverse function to the determined transfer function H(f). The determination of the transfer function H(f) is typically based on detecting the received amplitude of pilot carriers the transmission amplitude of the pilot carriers being known. It may occur that a self-created digital interference signal is in the same place as a pilot carrier in the frequency domain. If the interfered (pilot) carrier is not cancelled, in the DVB-T reception, the determined transfer function H(f) can result in being totally wrong due to the self-created digital interference. This will lead to a situation in which also the good carriers (carriers that are not interfered) will be destroyed when the channel correction multiplication is done. The method according to the first embodiment in which the carriers interfered by the self-created digital interference are cancelled by the channel estimation and correction block 312 can thus be seen beneficial in this context because the method prevents the channel estimation and correction block 312 to take the carriers which are interfered or totally destroyed into consideration when it determines the transfer funtion H(f) of the transmission path.

Figure 6:
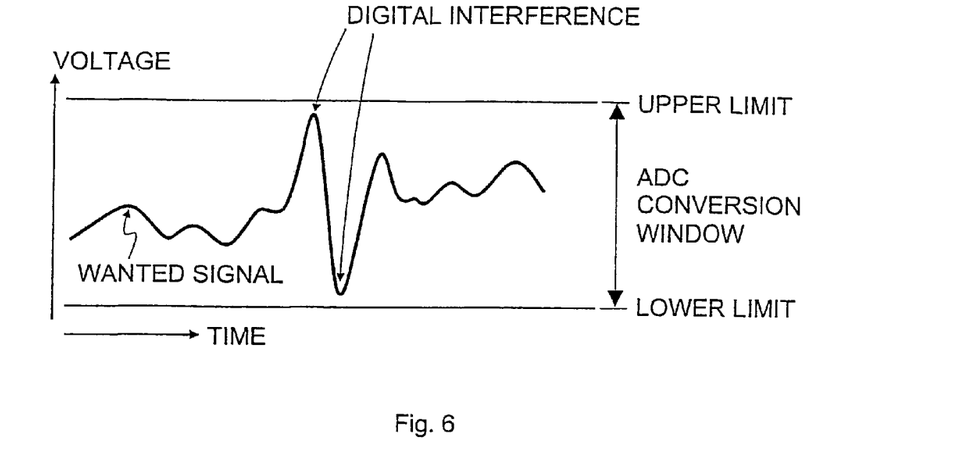
FIG. 6 shows, in time domain, a wanted DVB-T signal containing self-created digital interference.

The second exemplary embodiment relates to the automatic gain control (AGC). According to the prior art, the AGC block controls with a feedback control signal AGC-1 the gain of the adjustable RF amplifier 103 and with a feedback control signal AGC-2 the gain of the adjustable IF amplifier 108 so as to optimise the received DVB-T signal voltage level so that the received DVB-T signal fits to an ADC conversion window. FIG. 6 shows, in time domain, a wanted DVB-T signal containing self-created digital interference. The ADC conversion window is presented by a voltage difference. The effect of the digital interference can be seen as locally larger amplitudes of the DVB-T signal in the time domain. According to the prior art the gain is adjusted so that the ADC does not clip, that is the signal voltage of the DVB-T signal does not exceed an upper limit (nor go below a lower limit) of the ADC conversion window, because information carried by a clipped portion of the DVB-T signal will be corrupted.

However, if the clipping is caused by the digital interference, it can be seen that the clipped portion would not be useful in the DVB-T reception in any case. According to the second embodiment the digital interference information 210 fed to the COFDM demodulator 209 is fed to the AGC-block and is used in the AGC block so that the ADC conversion window is allowed to clip during the digital interference. In that way the sensitivity of the reception of the wanted DVB-T signal can be improved.

Figure 7:
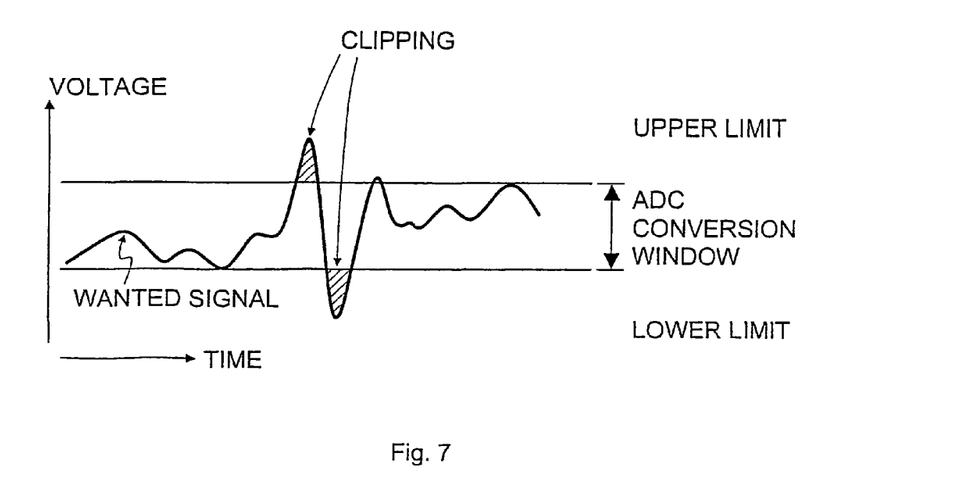
FIG. 7 shows AGC (Automatic Gain Control) and ADC (Analog-to-Digital Converter) operation according to an embodiment of the invention.

FIG. 7 shows the AGC and the ADC operation according to the second embodiment. The ADC conversion window is adjusted so that it is allowed to clip during the digital interference, thus the sensitivity of the reception of the wanted DVB-T signal is improved. The frequency cancellation algorithm presented in the first embodiment may be used together with the AGC adjustment method of the second embodiment.

The third exemplary embodiment relates to marking the reliability information of the interfered carriers low. This embodiment is applicable only if it is possible in the digital demodulation process to weight each of the carriers of the received DVB-T channel and to perform the digital demodulation process based on the weighting. According to this embodiment the digital interference information 210 fed to the COFDM demodulator 209 is used so as to set to the interfered carriers a low weighting coefficient in the digital demodulation process. The measured amplitudes of the digital interference may be taken into account so that the bigger the amplitude is the lower is the weighting coefficient. In this embodiment it is the channel estimation and correction block 312 which, based on the digital interference information 210, sets the weighting coefficients to the carriers. The weighting coefficients are thus taken into account in the channel estimation and correction process so that the effect of the self-created digital interference is minimized.

The third embodiment may be used together with the AGC adjustment method of the second embodiment.

Figure 8:
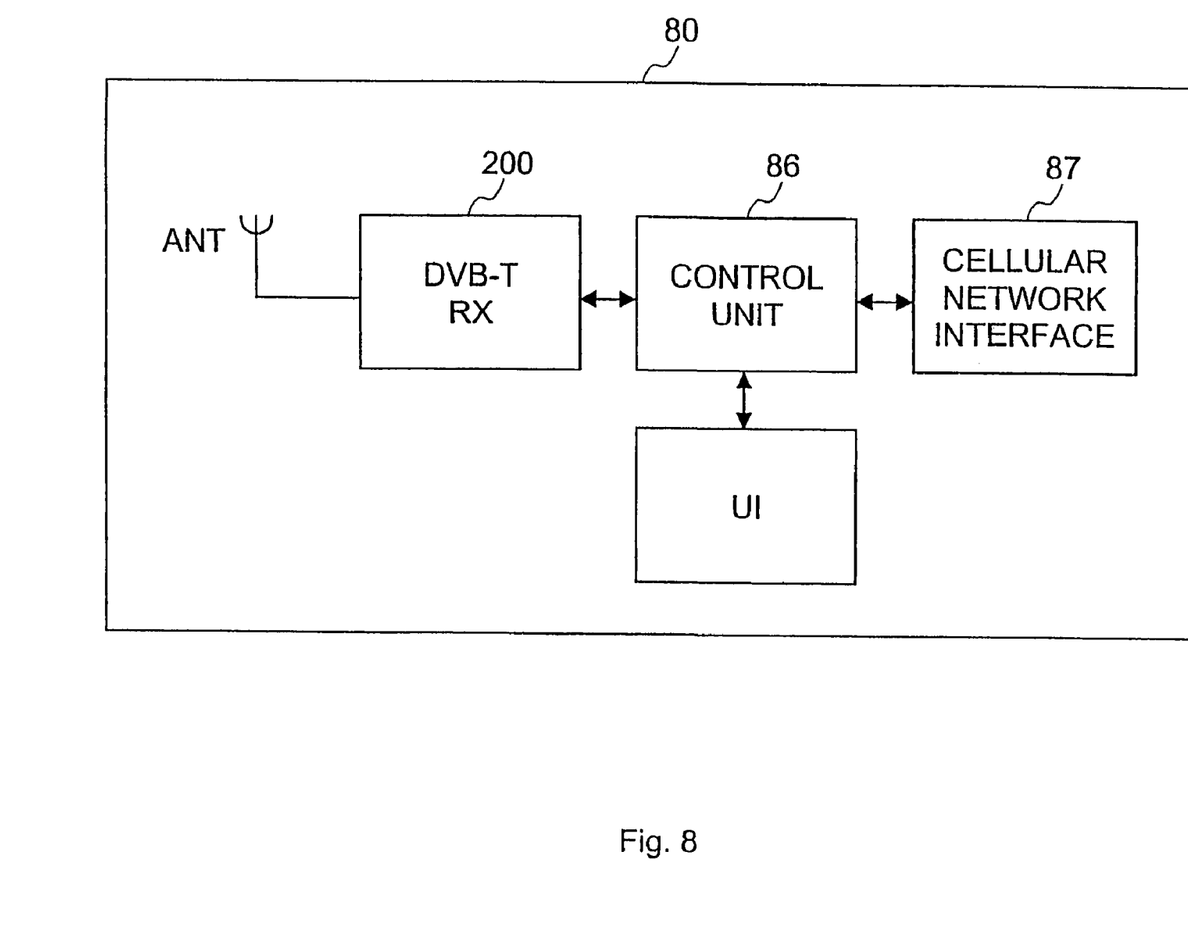
FIG. 8 shows a mobile communication device suitable for implementing the invention.

FIG. 8 shows a mobile communication device 80 suitable for implementing the invention. The mobile communication device 80 may be a wireless media terminal. The mobile communication device 80 comprises the DVB-T receiver 200 with an internal integrated antenna ANT, a user interface UI and a control unit 86. The DVB-T receiver 200 is coupled to the control unit 86 via a first control/data bus. The user interface UI is coupled to the control unit 86 via a second control/data bus. Additionally, for communication between the mobile communication device 80 and a second and/or third generation cellular network (not shown), the mobile communication device may comprise a cellular network interface 87 which is coupled to the control unit 86 via a third control/data bus. The cellular network interface 87 may comprise a radio frequency transceiver (not shown). The mobile communication device 80 may also contain Bluetooth and/or IrDA (Infrared Data Association) capabilities.

The control unit 86 comprises a processor with a memory and software for controlling the operation of the mobile communication device 80. The software contains an MPEG-2 protocol stack for decoding the demodulated digital data which the DVB-T receiver 200 provides for the control unit 86 via the first control/data bus. The user interface UI comprises a display and a keyboard for enabling the user to use the mobile communication device 80. The control unit 86 controls the presentation of information on the user interface UI, for example the presentation of the decoded MPEG-2 digital data (video stream) on the display. The demodulated digital data may contain IP (Internet Protocol) packets of an IP datacast or multicast service. The software of the control unit 86 may contain an IP protocol stack to handle the IP packets.

The digital interference information 210 containing information on the self-created digital interference is stored to a memory in the mobile communication device 80. Depending on the implementation the memory may be incorporated in the DVB-T receiver 200 or it may be external to the DVB-T receiver the memory then being, for example, the memory of the control unit 86.

The present invention enables the self-created digital interference to be taken into account in the demodulation process of the DVB-T signal. In addition to the mobile DVB-T receiver having an internal antenna the invention is also applicable in a mobile DVB-T receiver having a fixed external antenna.

Although it has been suggested that one carrier cancellation algorithm is used to cancel all the interfered carriers, according to an alternative implementation of the invention each interfered carrier is cancelled with its own algorithm.

Although the DVB-T system has been used as an example the invention is applicable also in other OFDM multicarrier modulation based systems, such as the japanese ISDB-T (Integrated Services Digital Broadcasting—Terrestrial) system. The invention is applicable with appropriate changes (in the presented digital algorithms) also in the receivers and transceivers of other wideband/broadband systems which use digital modulation. Although all the wideband/broadband systems do not use multicarrier modulation, and thus the interfered carrier itself, for example, may not be cancelled, a frequency cancellation algorithm may be performed, based on the in advance generated digital interference information, so as to cancel particular interfered frequencies inside the used frequency band.

The prior art shielding method in which critical interfering components are EMC-shielded may be used together with the invention.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method for reducing effects of self-created radio frequency interference on broadband reception, the method comprising:
    receiving a broadband signal at a broadband receiver;
    demodulating the received broadband signal in a demodulation process, the demodulation process being a part of the broadband reception;
    providing for the broadband reception information on frequencies of self-created radio frequency interference, the information having been generated and stored in a memory prior to the receiving of the broadband signal, the memory being accessible to the broadband receiver; and
    using the information in the broadband reception so as to reduce the effects of the self-created radio frequency interference on the broadband reception.

2. A method according to claim 1, wherein the method comprises:
    using the information in the demodulation process in order to reduce the effects of the self-created radio frequency interference on the demodulation process.

3. A method according to claim 1, wherein the broadband signal is a multi-carrier modulated signal and the information is used to cancel, in the demodulation process, a carrier which is interfered by the self-created radio frequency interference.

4. A method according to claim 3, wherein the interfered carrier frequency is cancelled by carrying out an algorithm.

5. A method according to claim 1, wherein the broadband signal is a multi-carrier modulated signal and the information is used to weight each of the carriers in the demodulation process so as to reduce the effects of the self-created radio frequency interference on the demodulation process.

6. A method according to claim 5, wherein the weighting is carried out by giving to each of the carriers a weighted value so that to an interfered carrier is given a lower value than to those carriers that are not interfered by the self-created radio frequency interference.

7. A method according to claim 1, wherein the method comprises:
    converting the received broadband signal from an analog form to a digital form, the conversion being based on a conversion window;
    controlling the size of the conversion window; and
    using the information on the self-created radio frequency interference in the control of the size of the conversion window so as to allow the conversion window to clip during the self-created radio frequency interference for improving sensitivity of the demodulation process.

8. A method according to claim 1, wherein the self-created radio frequency interference is coming from the broadband receiver itself or from a device in which the broadband receiver is located.

9. A method according to claim 1, wherein the self-created radio frequency interference is coupled to an internal antenna of the broadband receiver.

10. A method according to claim 1, wherein the broadband receiver is located in a mobile communication device so as to form a portable hand-held device suitable for broadband reception.

11. A method according to claim 1, wherein the broadband receiver is one of the following: a DVB-T (Digital Video Broadcasting-Terrestrial) receiver, an ISDB-T (Integrated Services Digital Broadcasting—Terrestrial) receiver.

12. A method according to claim 1, wherein the received broadband signal comprises at least one of the following: digital video stream, IP (Internet Protocol) packet stream, IP multicast packets.

13. A method according to claim 1, wherein the method comprises:
    receiving the broadband signal at a particular radio channel; and
    providing for the broadband reception information on self-created radio frequency interference at the particular radio channel.

14. A broadband receiver for reducing effects of self-created radio frequency interference on broadband reception, the broadband receiver comprising:
    an antenna for receiving a broadband signal at the broadband receiver;
    a demodulator for demodulating the received broadband signal in a demodulation process, the demodulation process being a part of the broadband reception; and
    a memory in the broadband receiver or in connection to the broadband receiver for storing information on frequencies of self-created radio frequency interference for the broadband receptions, the information having been generated prior to the receiving of the broadband signal, the broadband receiver being configured to:
    use the information in the broadband reception so as to reduce the effects of the self-created radio frequency interference on the broadband reception.

15. A broadband receiver according to claim 14, wherein the broadband receiver is configured to:

use the information in the demodulation process in order to reduce the effects of the self-created radio frequency interference on the demodulation process.

16. A communication device comprising a broadband receiver for reducing effects of self-created radio frequency interference on broadband reception, the broadband receiver comprising:

an antenna for receiving a broadband signal at the broadband receiver;

a demodulator for demodulating the received broadband signal in a demodulation process, the demodulation process being a part of the broadband reception; and a memory in the broadband receiver or in connection to the broadband receiver for storing information on frequencies of self-created radio frequency interference for the broadband reception, the information having been generated prior to the receiving of the broadband signal, the broadband receiver being configured to:

use the information in the broadband reception so as to reduce the effects of the self-created radio frequency interference on the broadband reception.

17. A communication device according to claim 16, wherein the communication device is a mobile communication device comprising, in addition to the broadband receiver, a cellular network interface for communicating, with a cellular network, the information in the broadband reception so as to reduce the effects of the self-created radio frequency interference on the broadband reception.

18. A broadband receiver according to claim 15, wherein the broadband signal is a multi-carrier modulated signal and the broadband receiver is configured to use the information to cancel, in the demodulation process, a carrier which is interfered by the self-created radio frequency interference.

19. A broadband receiver according to claim 15, wherein the broadband signal is a multi-carrier modulated signal and the broadband receiver is configured to use the information to weight each of the carriers in the demodulation process so as to reduce the effects of the self-created radio frequency interference on the demodulation process.

20. A broadband receiver according to claim 15, wherein the broadband receiver comprises:

an analog-to-digital converter for converting the received broadband signal from an analog form to a digital form, the conversion being based on a conversion window, and wherein the broadband receiver is configured to control the size of the conversion window; and wherein the broadband receiver is further configured to use the information on the self-created radio frequency interference in the control of the size of the conversion window so as to allow the conversion window to clip during the self-created radio frequency interference for improving sensitivity of the demodulation process.

21. A broadband receiver according to claim 14, wherein the broadband receiver is configured to receive the broadband signal at a particular radio channel and to provide for the broadband reception information on self-created radio frequency interference at the particular radio channel.

* * * * *